United States Patent
Jywe et al.

(10) Patent No.: US 7,636,170 B1
(45) Date of Patent: Dec. 22, 2009

(54) STATIC/DYNAMIC MULTI-FUNCTION MEASURING DEVICE FOR LINEAR UNIT

(75) Inventors: Wen-Yuh Jywe, Huwei Township, Yunlin County (TW); Chien-Hung Liu, Longjing Township, Taichung County (TW); Tung-Hsien Hsieh, Dajia Township, Taichung County (TW); Yun-Feng Teng, Douliou (TW)

(73) Assignee: National Formosa University, Yunlin (TW)

( * ) Notice: Subject to any disclaimer, the term of this patent is extended or adjusted under 35 U.S.C. 154(b) by 0 days.

(21) Appl. No.: 12/209,251

(22) Filed: Sep. 12, 2008

(51) Int. Cl.
*G01B 11/14* (2006.01)
*G01B 11/26* (2006.01)
*G01C 1/00* (2006.01)
*G01B 11/02* (2006.01)
*G01N 21/86* (2006.01)
*B23Q 1/62* (2006.01)
*G01B 5/004* (2006.01)
*G01B 5/00* (2006.01)

(52) U.S. Cl. ............... 356/614; 356/138; 356/498; 356/500; 250/559.29; 33/1 M; 33/503; 33/573

(58) Field of Classification Search ............ None
See application file for complete search history.

(56) References Cited

U.S. PATENT DOCUMENTS

| | | | | |
|---|---|---|---|---|
| 4,932,131 A * | 6/1990 | McMurtry et al. | ............ | 33/1 M |
| 5,768,137 A * | 6/1998 | Polidoro et al. | ............ | 700/186 |
| 5,839,324 A * | 11/1998 | Hara | ............ | 74/490.09 |
| 5,925,956 A * | 7/1999 | Ohzeki | ............ | 310/90.5 |
| 6,885,435 B2 * | 4/2005 | Galburt | ............ | 355/72 |
| 7,388,674 B2 * | 6/2008 | Yanaka et al. | ............ | 356/498 |
| 7,408,650 B2 * | 8/2008 | Ueshima et al. | ............ | 356/498 |
| 2004/0179192 A1 * | 9/2004 | Mizuno et al. | ............ | 356/139.1 |

* cited by examiner

*Primary Examiner*—Gregory J Toatley, Jr.
*Assistant Examiner*—Gordon J Stock, Jr.
(74) *Attorney, Agent, or Firm*—Chun-Ming Shih (57) ABSTRACT

A static/dynamic multi-function measuring device for linear unit, includes a foundation, a multi-direction sliding unit having eddy current detector, a linear motor, a linear unit with a sensing element and an optical measuring unit; the static/dynamic multi-function measuring device uses the linear motor to drive the multi-direction sliding unit with low friction to provide a non-contact measurement of a parallel alignment of the linear unit, a linear accuracy measurement of the linear unit, and a vibration measurement of the linear unit to detect the parallel alignment of the linear unit and the linear accuracy of a slide rail and so on, the static/dynamic multi-function measuring device also measures errors of the linear unit and a slide block moving in the vibrating and the rolling direction.

9 Claims, 10 Drawing Sheets

STATIC/DYNAMIC MULTI-FUNCTION MEASURING DEVICE FOR LINEAR UNIT

BACKGROUND OF THE INVENTION

1. Field of the Invention

The present invention relates to a static/dynamic multi-function measuring device for a linear unit, and more particularly, to a high-speed, high-precision measuring device for simultaneously measuring a parallel alignment of a moving slide block of the linear unit, a linear error of a slide rail, and testing errors of the slide block moving in the vibrating and the rolling direction.

2. Description of the Prior Art

As semiconductor industry and nanotechnology evolve, there are growing demands for high precision automatic foundations. One of the most popular driving components for foundations is the linear unit. In recent years, the applications of linear units are becoming more versatile and heading into the nanometer range, however, the detection techniques for linear units is just emerging, how to enhance the abilities of the linear units is now an imperative mission.

Presently, most precision detection techniques for linear units are based on traditional detection method using linear variable differential transformers (LVDT) and measuring meters, in one embodiment, the precision detection technique uses granite surface having high level precision as reference plane and attaches a measuring meter to a slide block base, thereafter it moves the slide block and measures the precision by the measuring meter.

However, due to the long requiring length for a common linear unit, it takes several steps to finish detecting the precision of the whole linear unit by using the above measuring method. Besides, each detecting step would generate an error, for example, it takes a while to measure a four meter long guide rail, and it also produces a result with high uncertainty, therefore it is not suitable for detecting a linear unit with the highest precision level "up" (parallel alignment: 2 μm/300 mm); furthermore, as to high precision requirements, the traditional detection method cannot provide better detection quality and more detection statistics to ensure the quality of the linear unit.

Therefore, the inventor of the present invention tries to improve the traditional detection techniques for linear unit by proposing a plurality of non-contact measuring methods using driving mechanisms with low friction to detect errors generated from the linear unit when it's moving, thereby implementing high speed and high precision requirements.

SUMMARY OF THE INVENTION

It is an object of the present invention to provide a static/dynamic multi-function measuring device, which comprises an air bearing and is suitable to drive a linear unit with low friction.

It is another object of the present invention to provide a measuring device which measures the parallel alignment of a slide rail and a slide block under a non-contact state.

It is yet another object of the present invention to provide a measuring device, which can provide a slide, rail with linear accuracy.

It is still another object of the present invention to provide a measuring device with an optical non-contact type slide rail.

The present invention discloses a static/dynamic multi-function measuring device for linear unit, comprising:

a foundation having a track on one side; a multi-direction sliding unit disposed on the foundation and the track, the multi-direction sliding unit having an eddy current detector and providing two support to support a moving mechanism for detection under a non-contact state;

a linear motor disposed on the foundation for driving the multi-direction sliding unit;

a linear unit comprising a sensing element, wherein the sensing element is disposed on a slide block slidably moving on the slide rail; the sensing element comprises two eddy current detectors for sensing a parallel alignment of two mutually perpendicular planes of the slide rail; the sensing element comprises two corner cubes parallely disposed for receiving and reflecting light beams;

an optical measuring unit comprising a light source for outputting a light beam to the sensing element, a spectroscope for splitting the light beam reflected by the sensing element into a plurality of split light beams, and a quadrant photodiode corresponding to at least one split light beam for determining a light spot displacement of the split light beam on the quadrant photodiode to generate a sensing signal based on a relative motion.

BRIEF DESCRIPTION OF THE DRAWINGS

The drawings disclose an illustrative embodiment of the present invention, which serves to exemplify the various advantages and objects hereof, and are as follows.

DETAILED DESCRIPTION OF THE PREFERRED EMBODIMENT

Figure 1:
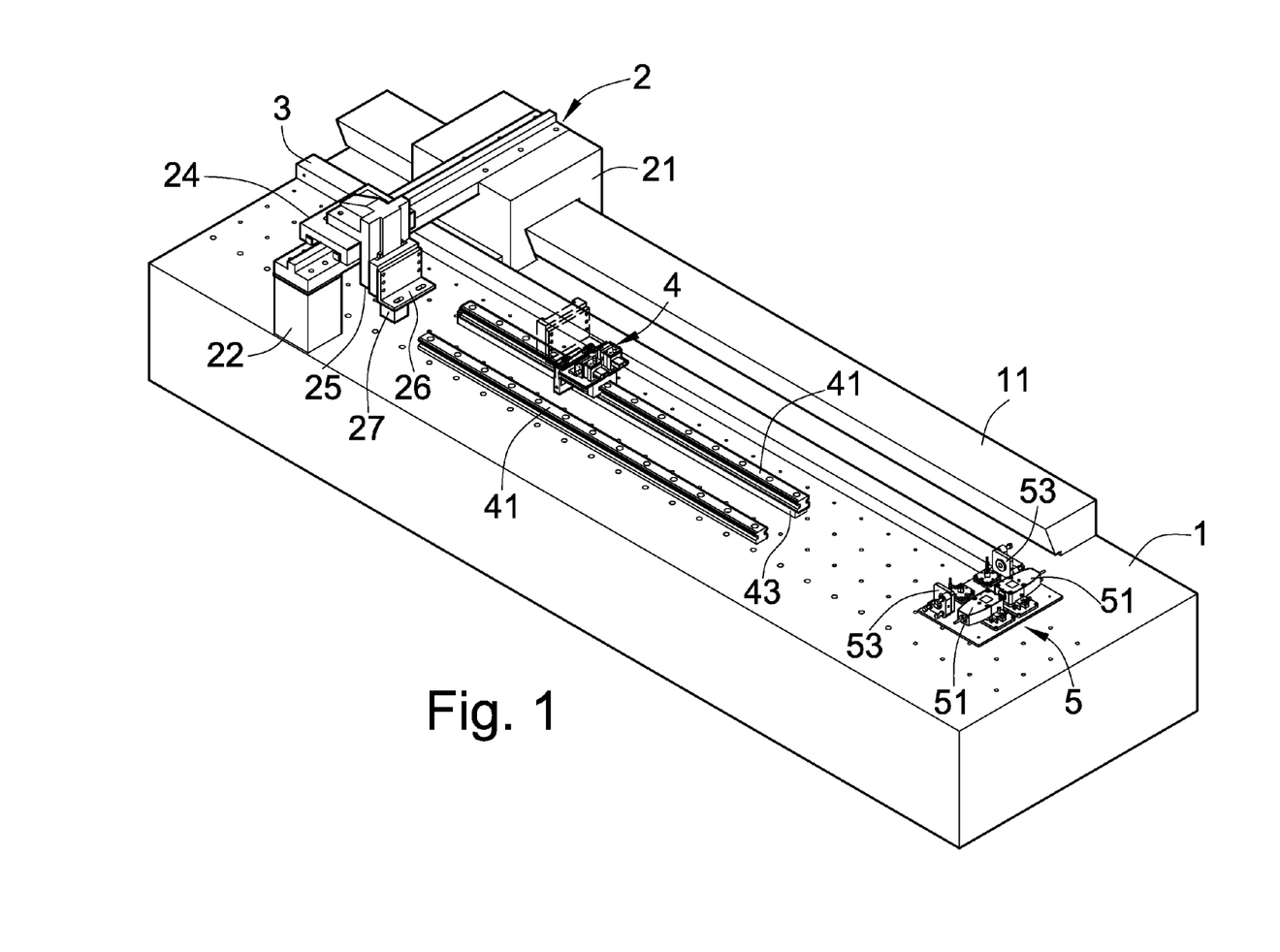
FIG. 1 illustrates a system structure view of the present invention.
Figure 10:
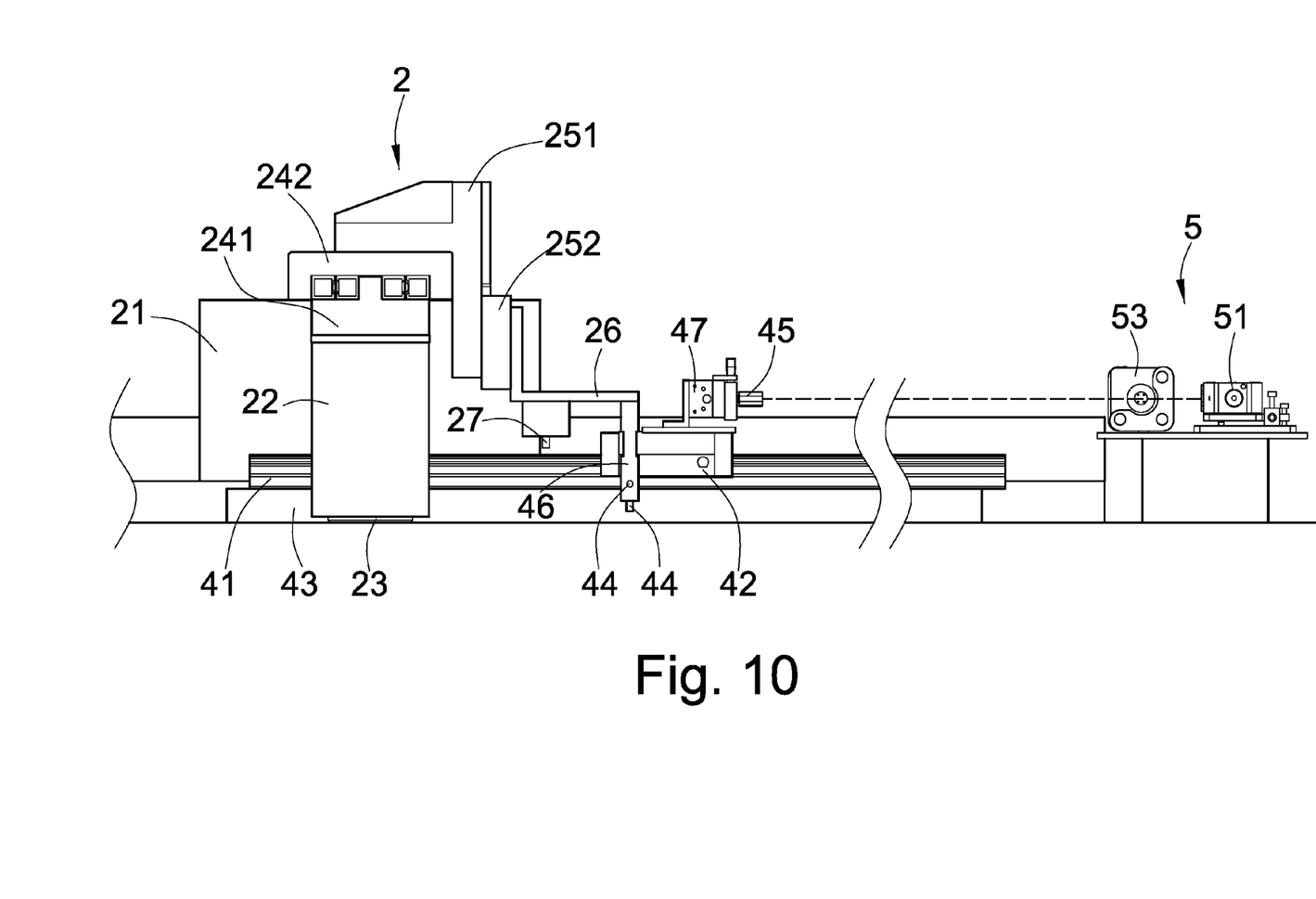
FIG. 10 illustrates a side view of the static/dynamic multi-function measuring device for linear unit.

Please refer to FIG. 1 and FIG. 10 for a static/dynamic multi-function measuring device for linear unit, the measuring device mainly comprises a foundation 1, a multi-direction sliding unit 2 having an eddy current detector 27, a linear motor 3, a linear unit 4 comprising a sensing element and an optical measuring unit 5.

Figure 2:
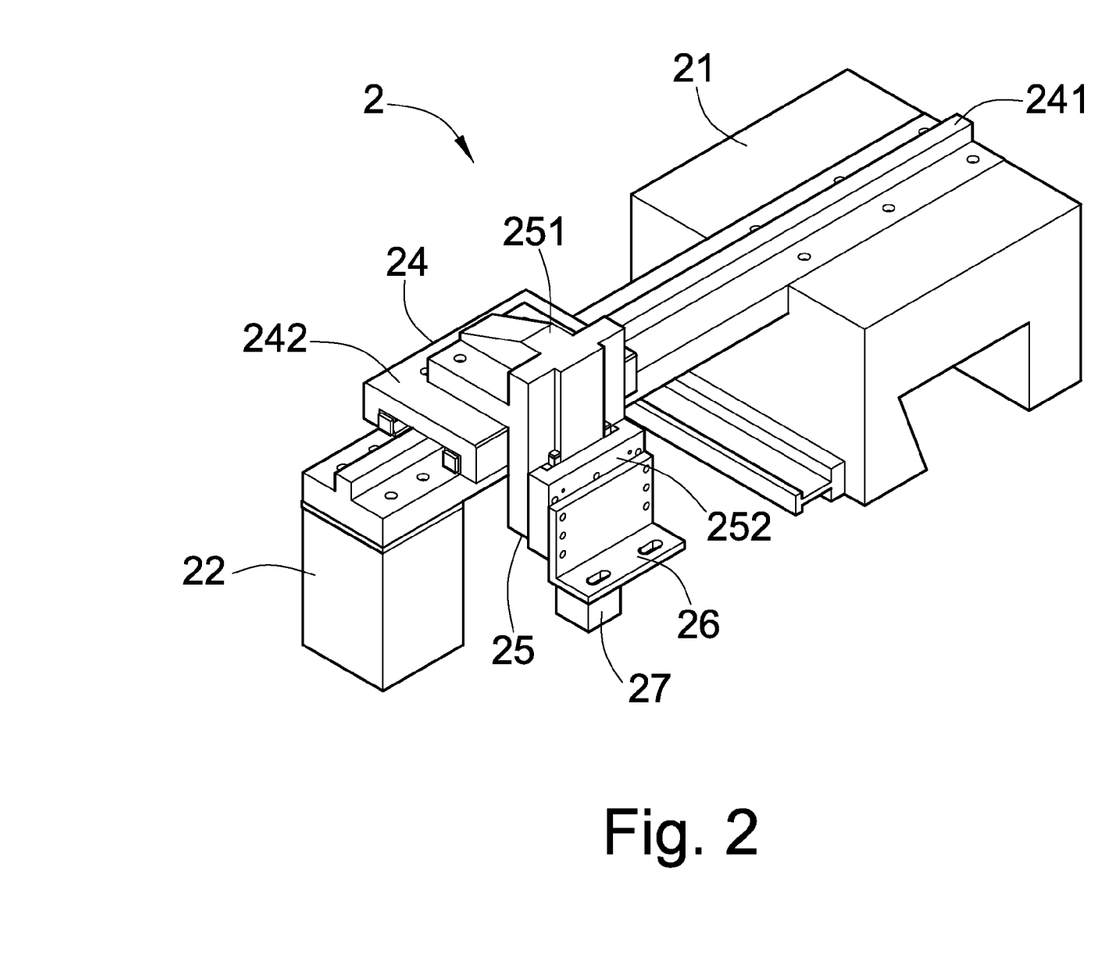
FIG. 2 illustrates a perspective view of a multi-direction sliding unit with low friction driving.
Figure 3:
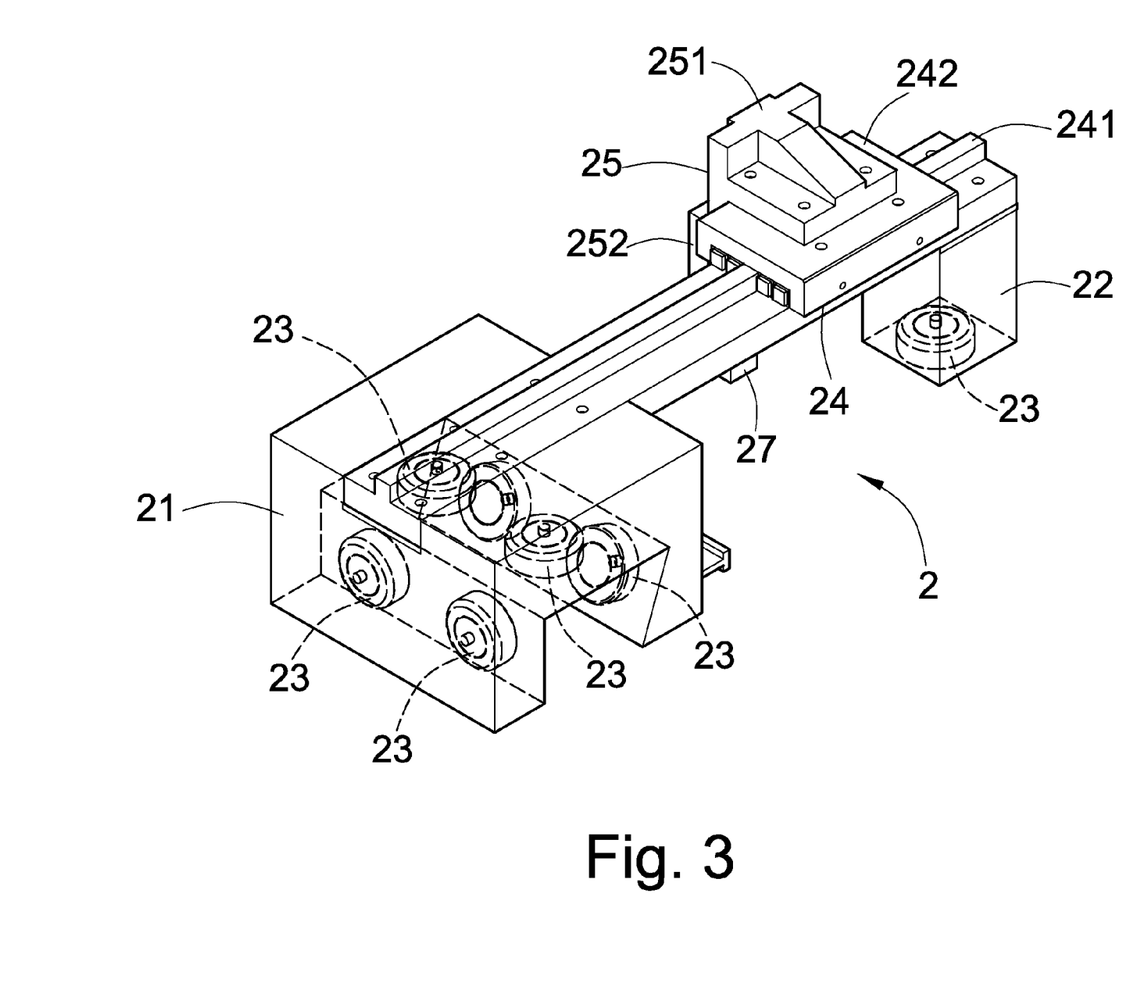
FIG. 3 illustrates a view of how a plurality of air bearings combines with moving mechanisms to form a multi-direction sliding unit.
Figure 4:
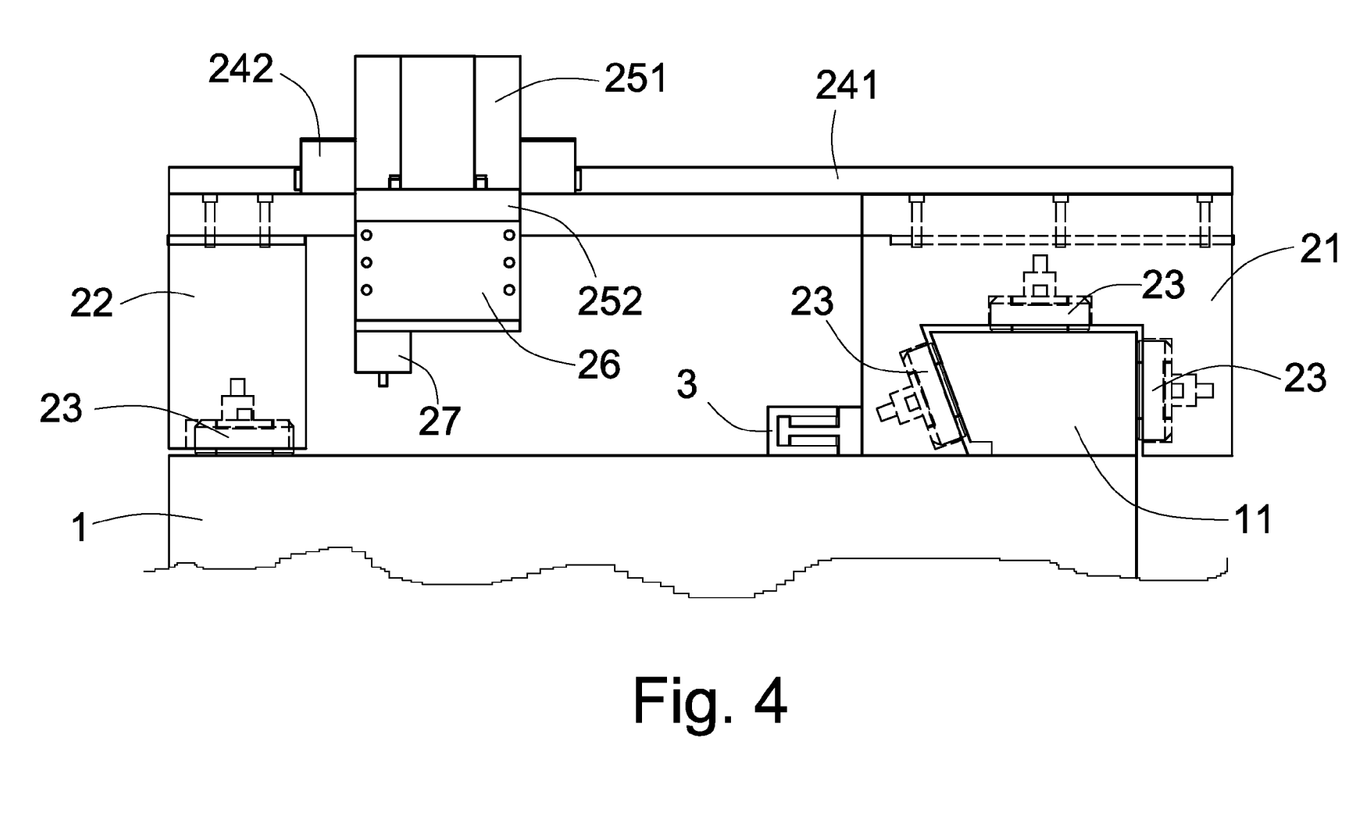
FIG. 4 illustrates a side view of how a plurality of air bearings combines with moving mechanisms to form a multi-direction sliding unit.
Figure 5:
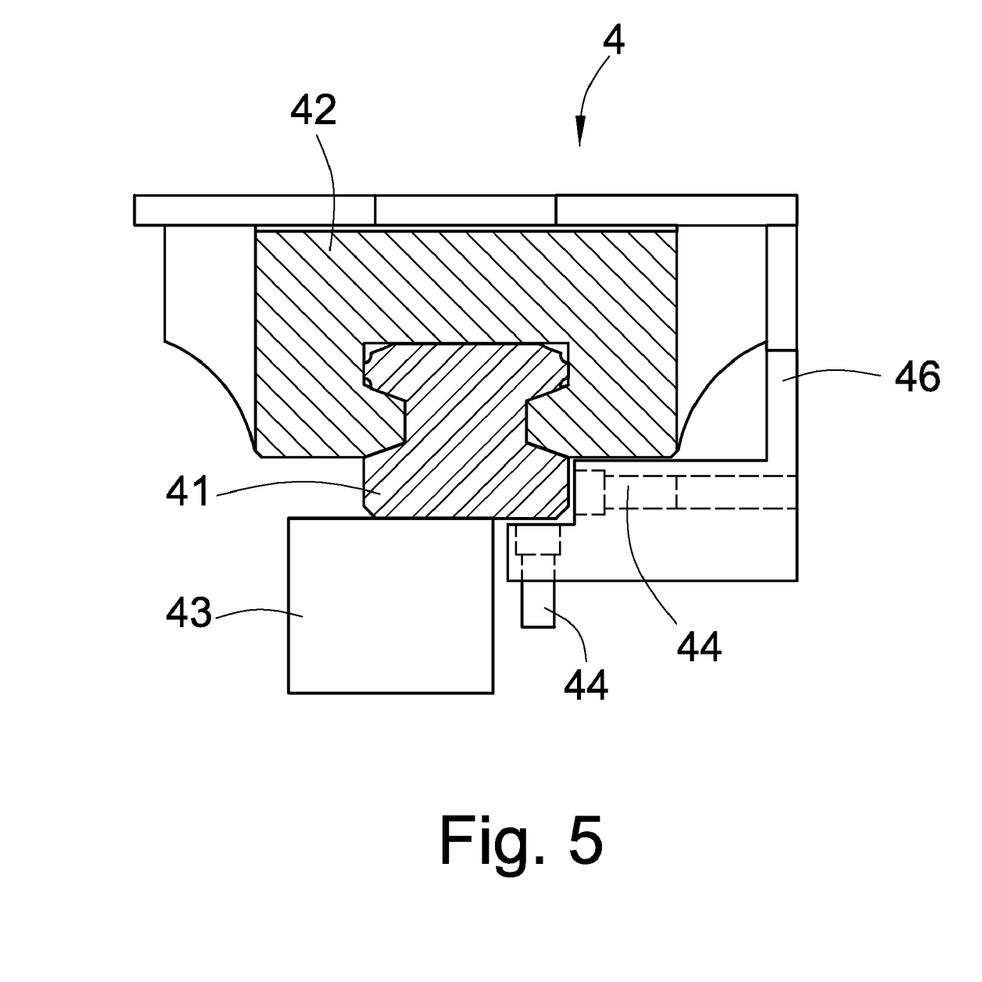
FIG. 5 illustrates a side view of a linear unit comprising a sensing element.
Figure 6:
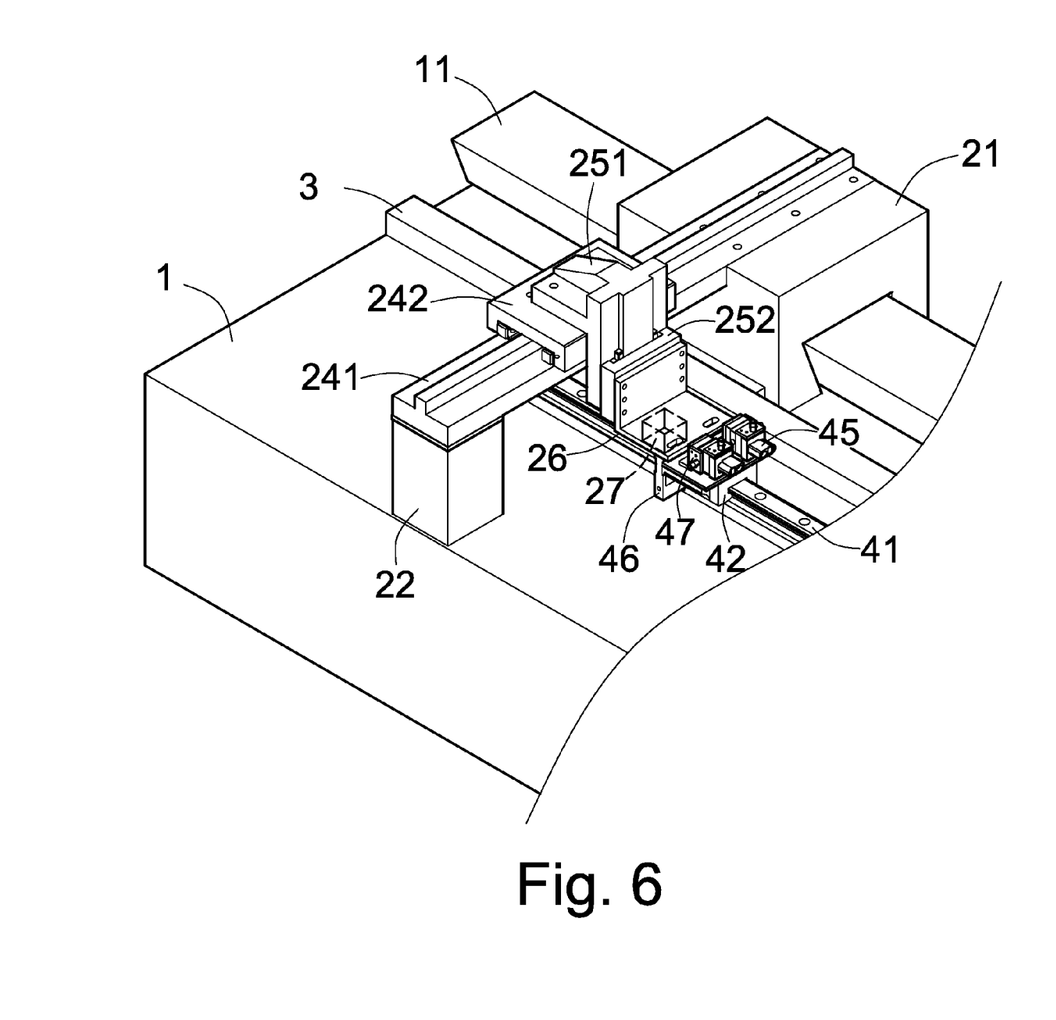
FIG. 6 illustrates a view of a linear motor driving a multi-direction sliding unit connecting with the linear unit comprising the sensing element during detection.
Figure 7:
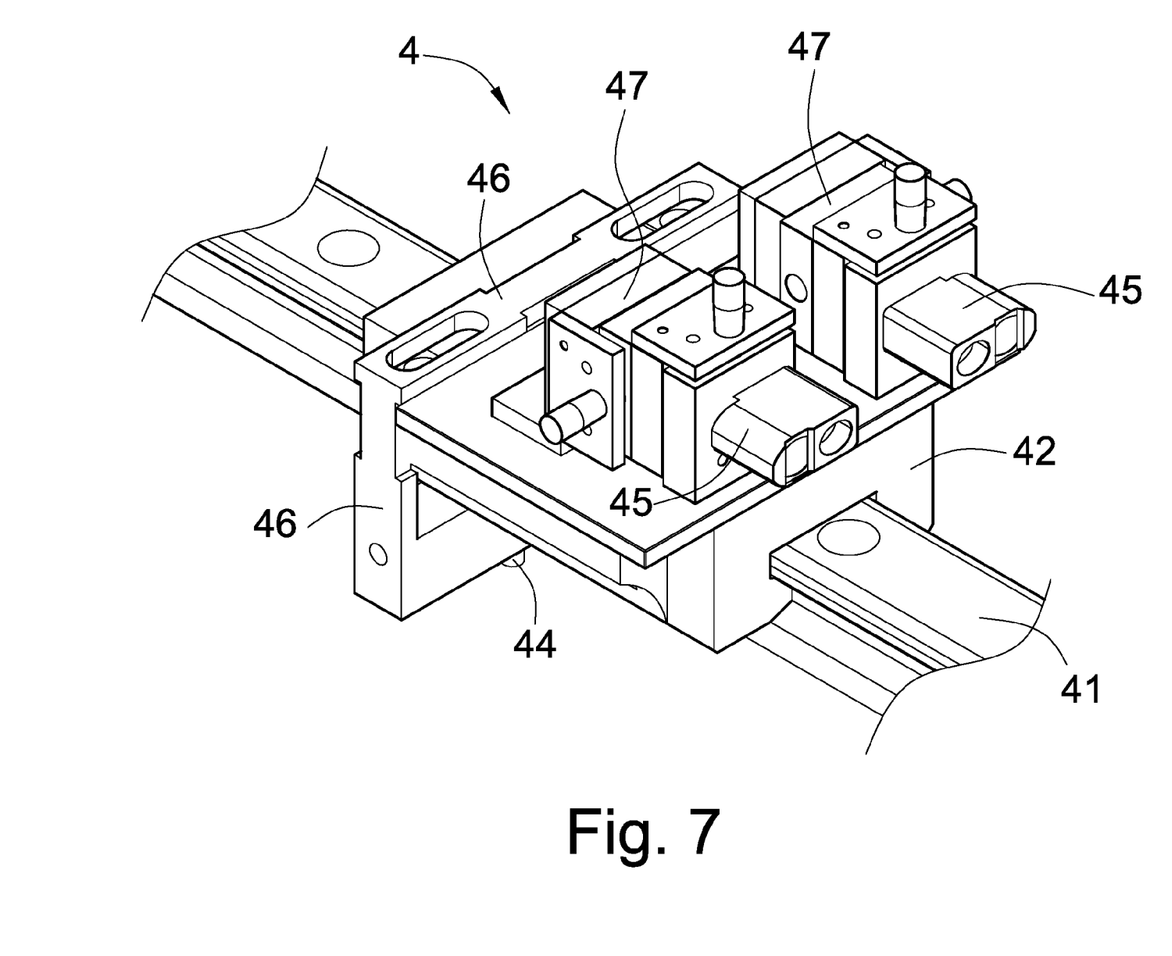
FIG. 7 illustrates a perspective view of the linear unit comprising the sensing element.

The foundation 1 is made of granite, the with foundation 1 comprises a track 11 disposed thereon;

As shown in FIG. 2 and FIG. 3, the multi-direction sliding unit 2 having the eddy current detector 27 is disposed on the foundation 1 and the track 11, and multi-direction sliding unit 2 provides two support 21, 22 to support a moving mechanism for detection under a non-contact state, the support 21, 22 are each disposed with air bearing 23 for moving on the surface of the foundation 1 under non-contact state, the moving mechanism is a horizontal moving mechanism 24 comprising a vertical moving mechanism 25 connecting to the two support 21, 22, so the horizontal moving mechanism 24 can slidably move on the multi-direction sliding unit 2 and the vertical moving mechanism 25 can slidably move on the horizontal moving mechanism 24 after it fixes the eddy current detector 27;

As shown in FIG. 4, the linear motor 3 is disposed on the foundation 1 to drive the multi-direction sliding unit 2;

The linear unit 4 comprises the sensing element, wherein the sensing element is disposed on the slide block 42 slidably moving on the slide rail 41; the sensing element comprises two eddy current detectors 44 for sensing a parallel alignment of two mutually perpendicular planes of the slide rail 41, as shown in FIG. 5; the sensing element comprises two corner cubes 45 parallely disposed for receiving and reflecting light beams, as shown in FIG. 6 and FIG. 7.

Figure 8:
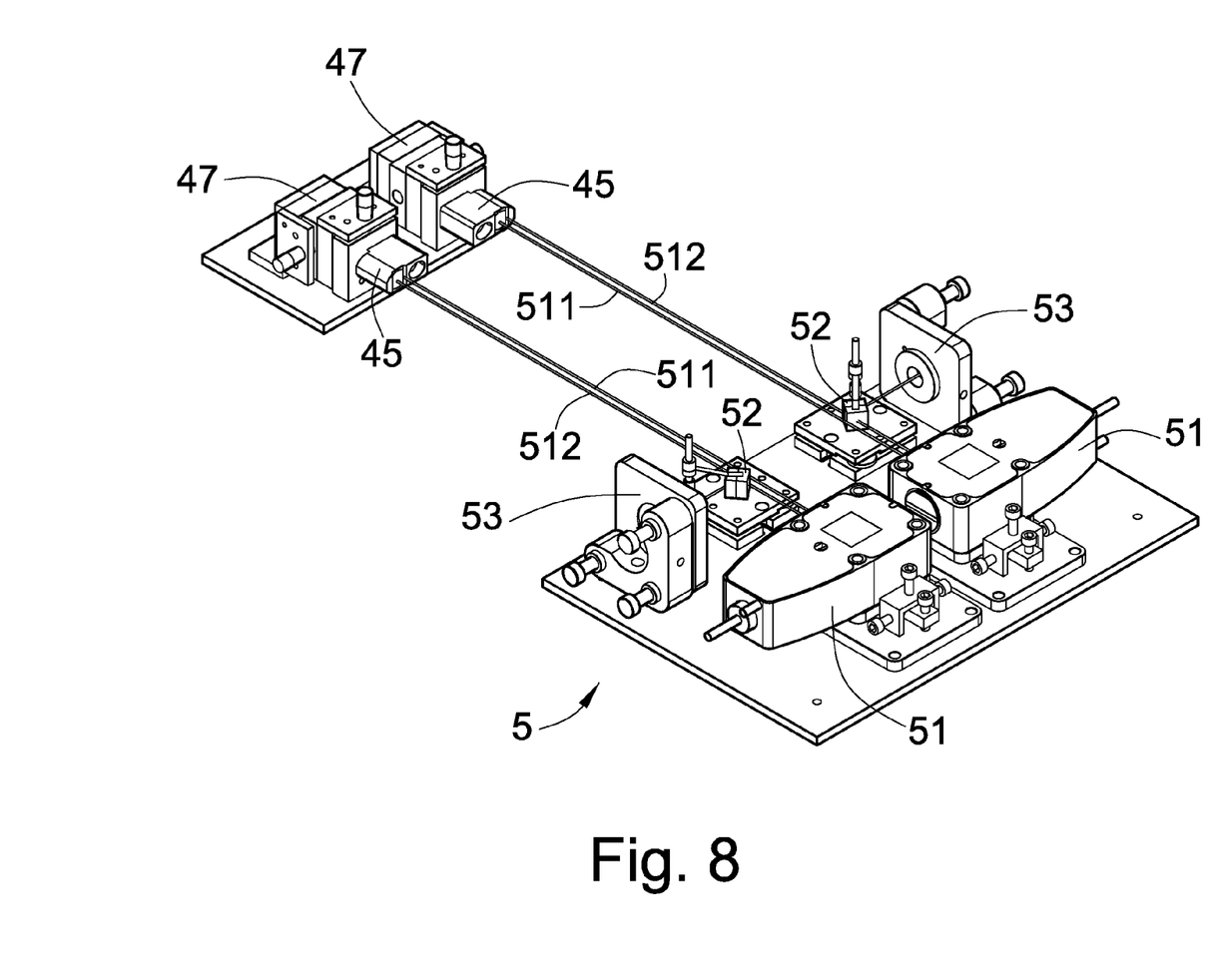
FIG. 8 illustrates a perspective view of a two-dimensional non-contact optical device composed of an optical measuring unit and the linear unit comprising the sensing element.

As shown in FIG. 8, the optical measuring unit 5 comprising a light source 51 for outputting a light beam 511 to the sensing element, a beamsplitter 52 for splitting the light beam 511 reflected by the sensing element into a plurality of split light beams, and a quadrant photodiode 53 corresponding to at least one split light beam for determining a light spot displacement of the split light beam on the quadrant photodiode 53 to generate a vibrating or rolling signal based on a relative motion.

Refer to FIG. 2 to FIG. 4 once again, the multi-direction sliding unit 2 having the eddy current detector 27 has its first support 21, second support 22 and each corresponding surface contacting the foundation 1 disposed with at least one air bearing 23 for the air bearing 23 to let the multi-direction sliding unit 2 move on the surfaces of the foundation 1 and the track 11 of the foundation under a non-contact state. In the present invention, the first support 21 and the corresponding contacting surface of the foundation track 11 are disposed with two air bearing 23, and the second support 22 and the corresponding contacting surface of foundation 1 is disposed with an air bearing 23; a pressure valve is used to adjust the spacing between the air bearings 23 inside the support 21, 22 and the foundation 1, then the pressure valve is used to adjust the level of the multi-direction sliding unit 2. After the multi-direction sliding unit 2 is adjusted, it is driven by the linear motor 3 on the foundation 1 to move back and forth.

The moving mechanism comprises the horizontal moving mechanism 24 comprising the vertical moving mechanism 25, wherein the horizontal moving mechanism 24 connects to two support 21, 22. The moving mechanism comprises slide rail bases 241, 251 and slide block bases 242, 252, and the slide rail base 251 of the vertical moving mechanism 25 is fixed on the slide block base 242 of the horizontal moving mechanism 24, the slide block base 252 of the vertical moving mechanism 25 directly or indirectly fixes the eddy current detector 27 or a fixture 26, in FIG. 4, the slide block base 252 of the vertical moving mechanism 25 directly fixes the fixture 26, which fixes the eddy current detector 27 at its bottom to let the eddy current detector 27 measuring the linear accuracy of the surface of the slide rail 41, so as to generate an error signal and to smoothly transmit it to an signal receiving terminal of the multi-direction sliding unit 2.

Please refer to FIG. 4 again, the linear motor 3 is disposed on the foundation 1 and connects to the first support 21 of the multi-direction sliding unit 2, the linear motor 3 is used for driving the multi-direction sliding unit 2, and then the multi-direction sliding unit 2 enables the eddy current detector 27 to conduct a non-contact measurement with the slide block 42 of the linear unit 4, as shown in FIG. 6.

As shown in FIG. 5, the linear unit 4 having the sensing element can uses the sensing element to control the eddy current detector 44 to sense the parallel alignment of two mutually perpendicular planes of the slide rail 41. To measure the error of the bottom of the slide rail 41, first a retaining bracket 43 is mounted on the foundation 1 and the slide rail 41 of the linear unit 4 to be detected is fixed on the retaining bracket 43, then the eddy current detector 44 is fixed to the slide block 42 of the linear unit 4 by a second fixture 46, the slide block 42 is directly fixed to the slide block base 252 of the vertical moving mechanism 25 on the multi-direction sliding unit 2; the multi-direction sliding unit 2 drives the slide block 42 of the linear unit 4 and the eddy current detector 44 for non-contact measurement. When the slide block 42 moves on the slide rail 41, the eddy current detector 44 detects errors in the horizontal & vertical direction.

As shown in FIG. 7, the linear unit 4 comprising the sensing element having two corner cube 45 parallely disposed to receive and reflect the light beam 511, the two corner cube 45 is fixed to the slide block 42 of the linear unit 4 by the third fixture 47.

As shown in FIG. 8, FIG. 9, FIG. 9A and FIG. 9B, the optical measuring unit 5 comprises two micro interferometer having a light source 51, two spectroscopes 52 and two quadrant photodiodes 53 integrally fixed to the foundation 1, two corner cube 45 are fixed to the slide block 42 of the linear unit 4, while the slide block 42 is driven by the multi-direction sliding unit 2 controlled by the linear motor 3, thus the multi light path design and the quadrant photodiodes 53 forms a two-dimensional optical non-contact measuring device which can uses the two quadrant photodiodes 53 to detect an angle error generated when the linear unit 4 moves.

Figures 9, 9A, 9B:
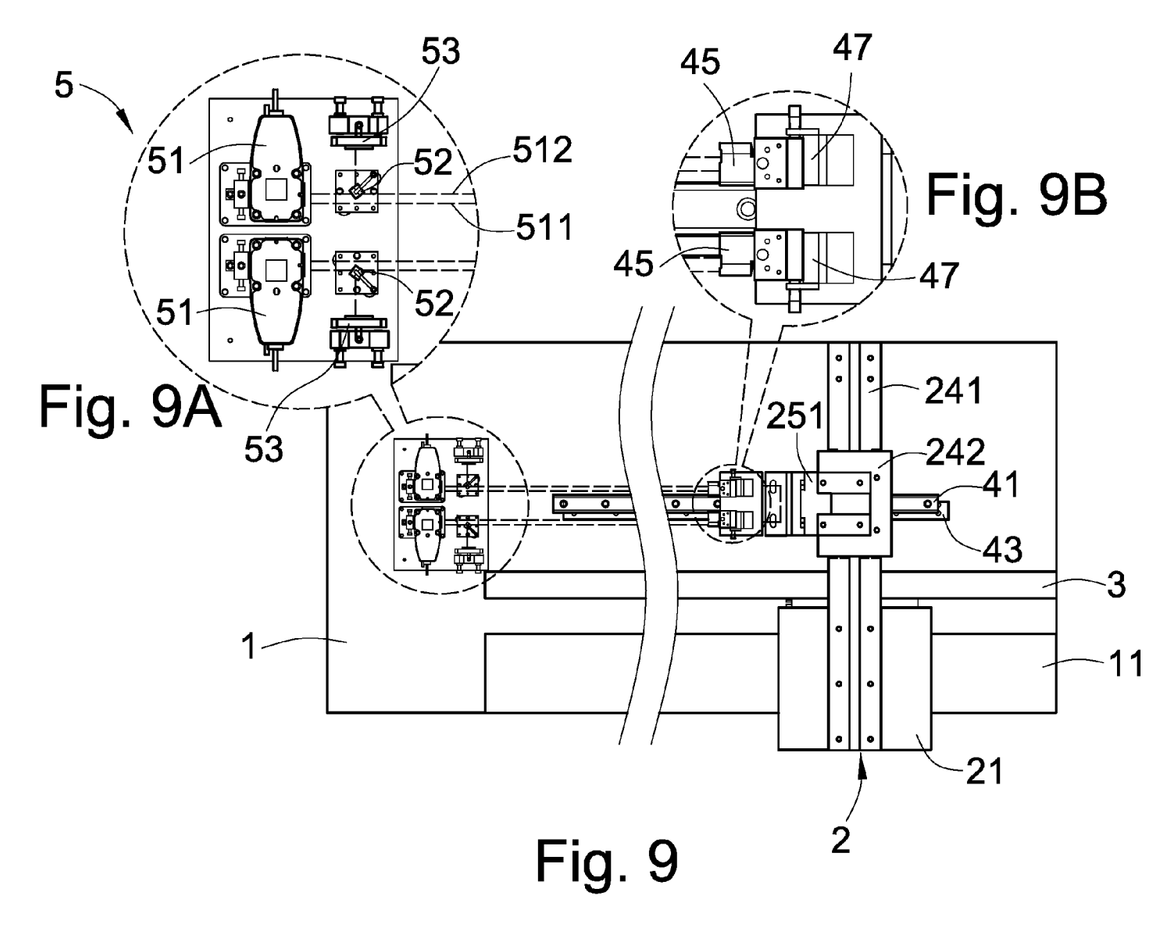
FIGS. 9, 9A and 9B illustrates a view of the two-dimensional non-contact optical device composed of the optical measuring unit and the linear unit comprising the sensing element.

When the linear unit 4 moves, the light beam 511 reflected on the corner cube 45 would generate a small displacement due to the movement of the slide block 42, so the beam path 512 of the light beam 511 reflected by the corner cube 45 will change, the reflected beam path 512 is then traveling through the spectroscope 52 to be detected by the quadrant photodiode 53, the quadrant photodiode 53 detects the position change of the light spot and converts it into a displacement variation signal with two times the resolution to obtain a vibration variation and rolling variation of the slide block 42.

It is possible to use the corner cube 45 to measure the vibration and rolling variation of the movement of the slide block 42, therefore:

Horizontal error: $\Delta y = x_1$

Vertical error: $\Delta z = y_1$ $(x_1, y_1)$ and $(x_2, y_2)$ are the displacement output of quadrant photodiode (Q1) and (Q2) respectively.

Rolling variation:

$$\theta_1 = \frac{y_2 - y_1}{d}$$

Vibration variation:

$$\theta_2 = \frac{L_2 - L_1}{d}$$

The present invention provides a static/dynamic multi-function measuring device for linear unit, while comparing with other prior art techniques, is advantageous in:

1. The present invention uses air bearings to make the multi-direction sliding unit move more smoothly with fine-tuning & weight carrying capabilities.

2. The present invention uses eddy current detector to conduct non-contact measurement, it is possible to obtain the horizontal and vertical errors of the linear unit without using a standard gauge made of granite.

3. The present invention uses eddy current detector to conduct non-contact measurement to simultaneously obtain the horizontal & vertical errors to shorten measuring time.

4. The present invention uses a linear motor to slowly drive the slide block of the linear unit with low friction; therefore the linear motor does not affect the detected parallel alignment.

5. The present invention doesn't need to use granite reference plane to detect the parallel alignment; besides, the present invention only requires to change the retaining bracket, thereby reducing the maintenance time and cost of the measuring device.

6. The present invention uses eddy current detector to conduct non-contact measurement to effectively enhance the detection precision and the accuracy, and also the lifetime of the measuring device.

What is claimed is:

1. A static/dynamic multi-function measuring device for a linear unit, comprising:
   a foundation having a track on one side;
   a multi-direction sliding unit disposed on the foundation and the track, the multi-direction sliding unit having an eddy current detector and providing two support that supports a moving mechanism and that detects under a non-contact state;
   a linear motor disposed on the foundation that drives the multi-direction sliding unit;
   a linear unit comprising a sensing element, wherein the sensing element is disposed on a slide block slidably moving on a slide rail;
   an optical measuring unit comprising a light source that outputs a light beam to the sensing element, a beamsplitter that splits the light beam reflected by the sensing element into a plurality of split light beams, and a quadrant photodiode corresponding to at least one split light beam that determines a light spot displacement of the split light beam on the quadrant photodiode to generate a sensing signal based on a relative motion.

2. The static/dynamic multi-function measuring device for a linear unit as claimed in claim 1, wherein each support is disposed with an air bearing that enables movement on a surface of the foundation under a non-contact state.

3. The static/dynamic multi-function measuring device for a linear unit as claimed in claim 1, wherein each support is disposed with an air bearing that enables movement on a surface of the foundation and the surface of the track under a non-contact state.

4. The static/dynamic multi-function measuring device for a linear unit as claimed in claim 1, wherein the moving mechanism comprises a horizontal moving mechanism comprising a vertical moving mechanism, and the horizontal moving mechanism further connects to the two support that lets the horizontal moving mechanism slidably move on the multi-direction sliding unit, wherein the vertical moving mechanism slidably moves on the horizontal moving mechanism after it fixes the eddy current.

5. The static/dynamic multi-function measuring device for a linear unit as claimed in claim 1, wherein the eddy current detector measures a linear accuracy of an upper surface of the slide rail and transmits a detected error signal to a signal receiving terminal of the multi-direction sliding unit.

6. The static/dynamic multi-function measuring device for a linear unit as claimed in claim 1, wherein the sensing element comprises two eddy current detectors disposed on the slide block, the eddy current detector further senses a parallel alignment of two mutually perpendicular planes of the slide rail.

7. The static/dynamic multi-function measuring device for a linear unit as claimed in claim 1, wherein the sensing element comprises two corner cubes parallely disposed on the slide block, each corner cube further receives and reflects light beams.

8. The static/dynamic multi-function measuring device for a linear unit as claimed in claim 1, wherein the light source is provided by a micro interferometer.

9. The static/dynamic multi-function measuring device for a linear unit as claimed in claim 1, wherein the linear motor connects to the support of the multi-direction sliding unit that drives the multi-direction sliding unit, then the multi-direction sliding unit enables the eddy current detector to conduct a non-contact measurement with the slide block of the linear unit.

* * * * *